United States Patent [19]
Matsuura et al.

[11] Patent Number: 5,752,713
[45] Date of Patent: May 19, 1998

[54] VEHICLE OCCUPANT CRASH PROTECTOR

[75] Inventors: Naoki Matsuura; Kenji Matsui; Shoichi Ibe, all of Aichi-ken, Japan

[73] Assignee: Kabushiki Kaisha Tokai-Rika-Denki-Seisakusho, Aichi-ken, Japan

[21] Appl. No.: 717,325

[22] Filed: Sep. 20, 1996

[30] Foreign Application Priority Data

Sep. 25, 1995 [JP] Japan ................... 7-245848
Jul. 24, 1996 [JP] Japan ................... 8-194375

[51] Int. Cl.[6] ........................... B60R 21/22
[52] U.S. Cl. ................... 280/730.2; 280/730.1
[58] Field of Search ............. 280/730.2, 728.1, 280/730.1

[56] References Cited

U.S. PATENT DOCUMENTS 5,462,308  10/1995  Seki et al. ................ 280/730.2

FOREIGN PATENT DOCUMENTS 584781    8/1993   European Pat. Off. .
4232658   3/1994   Germany .
3276844   12/1991  Japan .
5139232   6/1993   Japan .
5193430   8/1993   Japan .
61192     1/1994   Japan .
06344841  12/1994  Japan .
9419215   9/1994   WIPO .

*Primary Examiner*—Eric D. Culbreth
*Attorney, Agent, or Firm*—Sixbey Friedman Leedom & Ferguson; Thomas W. Cole

[57] ABSTRACT

A structurally-simple and inexpensive vehicle occupant crash protector is provided which can be miniaturized in its entirety and cope with an impact which occurs at the side of a vehicle. A folded air bag is disposed in the vicinity of a window of a vehicle. An end of the air bag in the direction in which said bag expands and moves, is pulled out by a wire retracted to a tensile device so that the air bag is expanded and a state of expansion of the air bag is held. Thus, the tensile device rapidly expands the air bag and helps the inflation thereof. Further, the end of the expanded and inflated air bag is supported by the wire retracted to the tensile device so that the expanded state of the air bag is properly held.

18 Claims, 8 Drawing Sheets

VEHICLE OCCUPANT CRASH PROTECTOR

BACKGROUND OF THE INVENTION

1. Field of the Invention

The present invention relates to a vehicle occupant crash protector of a type wherein a bag is inflated to cope with an impact occurring at the side of a vehicle to thereby protect the head or the like of a vehicle occupant.

2. Description of the Related Art

A vehicle occupant crash protector has heretofore been proposed wherein when an acceleration greater than or equal to a predetermined value is applied due to an impact or the like which occurs at the side of a vehicle, an air bag is inflated and expanded between a vehicle occupant and a vehicle door.

A so-called side air bag apparatus, which has heretofore been proposed, is mounted to a pillar portion such as a center pillar, a quarter pillar, a rear pillar or the like provided within the interior of the vehicle, or an upper portion of a door trim, or a roofside or the like. Further, a large air bag is expanded over the window glass of the vehicle door.

Particularly, this type of side air bag apparatus needs to use a large-capacity type air bag so as to absorb the kinetic energy of the occupant head and reliably support it when the air bag is inflated.

An inflator having large gas generating capacity must be used to expand such a large-capacity type air bag in a predetermined short time. A vehicle occupant crash protector having the large inflator and the large air bag becomes expensive and is brought into large size over its entirety. Therefore, the accommodation of the vehicle occupant crash protector into a space in the door trim becomes difficult in terms of design.

SUMMARY OF THE INVENTION

With the foregoing in view, it is an object of the present invention to provide a structurally-simple and inexpensive vehicle occupant crash protector which is miniaturized in its entirety and is capable of coping with an impact which occurs at the side of a vehicle.

According to a first aspect of the present invention, there is provided a vehicle occupant crash protector which copes with an impact which occurs at the side of a vehicle, comprising:

a bag provided so as to be folded in the vicinity of a window of the vehicle and expanded by the flow of gas injected from an inflator;

at least one through member provided at an end of the bag in the direction in which the bag expands and moves;

a fixing member provided in the vicinity of the window; and a tensile device for retracting therein and supporting the other end of a string member having one end fixed to said fixing member and extending through the through member, thereby expanding the bag and holding a state of expansion of the bag.

Owing to the above-described construction, the string member is retracted by the tensile device so as to mount the string member taut between the fixing member and the tensile device to thereby expand the bag, and thereafter the string member is supported by the tensile device, so that the string member can hold a part of the air bag expanded through the through member so as to receive a load applied to the bag.

A second aspect of the present invention is a vehicle occupant crash protector in which, in the vehicle occupant crash protector according to the first aspect of the present invention, the fixing member is placed near the window of the vehicle at a portion of a side of the end of the expanded bag, the tensile device is placed near the window of the vehicle at a portion across the window from said fixing member, of the side of the end of the expanded bag, and the string member mounted taut between the fixing member and the tensile device is capable of supporting the portion of the expanded bag through the through member.

Owing to the above-described construction, when the string member is retracted by the tensile device, the string member is mounted taut between the tensile device and the fixing member. Thus, the string member can directly and stably receive a load applied to the bag through the through member in a state of being adjacent to one end portion of the expanded bag.

According to a third aspect of the present invention, there is provided a vehicle occupant crash protector which copes with an impact occurring at the side of a vehicle, comprising:

a bag disposed so as to be folded in the vicinity of a window of the vehicle and expanded by the flow of gas injected from an inflator;

an attachment member provided at an end of the bag in the direction in which the bag expands and moves; and a tensile device for retracting therein and supporting a string member whose one end is fixed to the attachment member, thereby expanding the bag and holding a state of expansion of the bag.

Owing to the above-described construction, when the string member is retracted by the tensile device so as to directly expand the bag and is thereafter supported by the tensile device, the string member can directly hold the state of expansion of the bag so as to receive a load applied to the bag.

According to a fourth aspect of the present invention, there is provided a vehicle occupant crash protector which copes with an impact occurring at the side of a vehicle, comprising:

a bag disposed so as to be folded in the vicinity of a window of the vehicle and expanded by the flow of gas injected from an inflator;

a string member for pulling the bag; and a tensile device for retracting therein and supporting the string member at the time of an impact which occurs at the side of the vehicle, thereby expanding the bag and holding a state of expansion of the bag.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DETAILED DESCRIPTION OF THE PREFERRED EMBODIMENTS

Preferred embodiments of the present invention will hereinafter be described in detail with reference to the accompanying drawings.

FIGS. 1 through 4 show a vehicle occupant crash protector according to a first embodiment of the present invention. A structure of the vehicle occupant crash protector mounted to a portion of a door 10 of a vehicle is shown as an illustrative example. An air bag 14, which is a bag body, is accommodated inside a window frame portion 12 provided on the center pillar side of the door 10.

Figure 1:
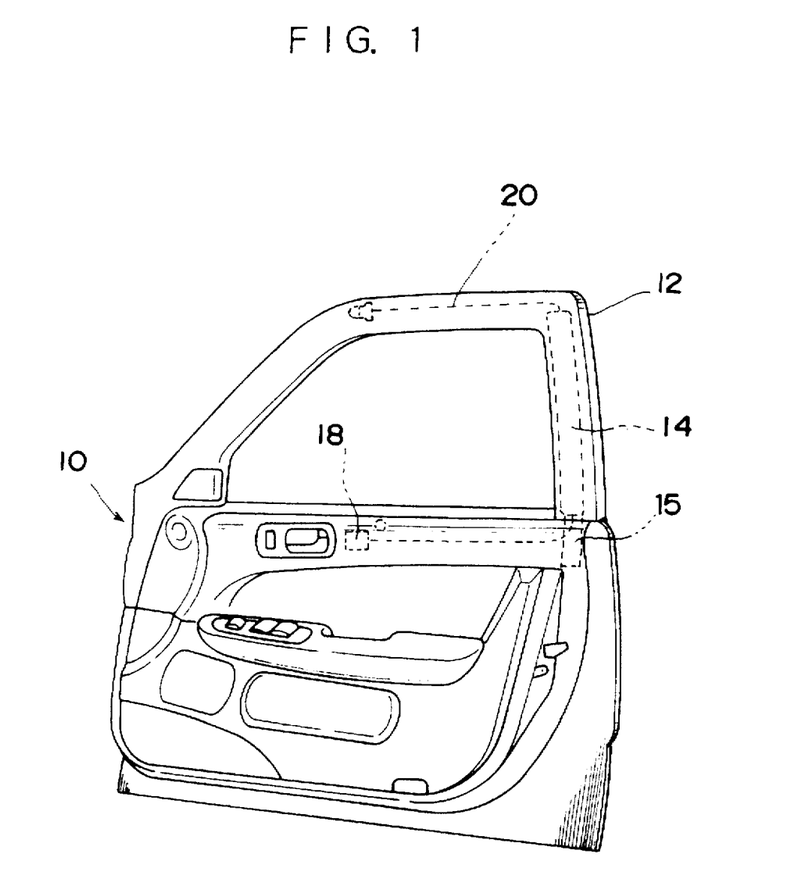
FIG. 1 is a front view showing in a normal state a door portion to which a vehicle occupant crash protector according to a first embodiment of the present invention is attached.

The air bag 14 serves so as to inflate and expand by the flow of gas generated from an inflator 15 with an acceleration sensor.

Figure 3:
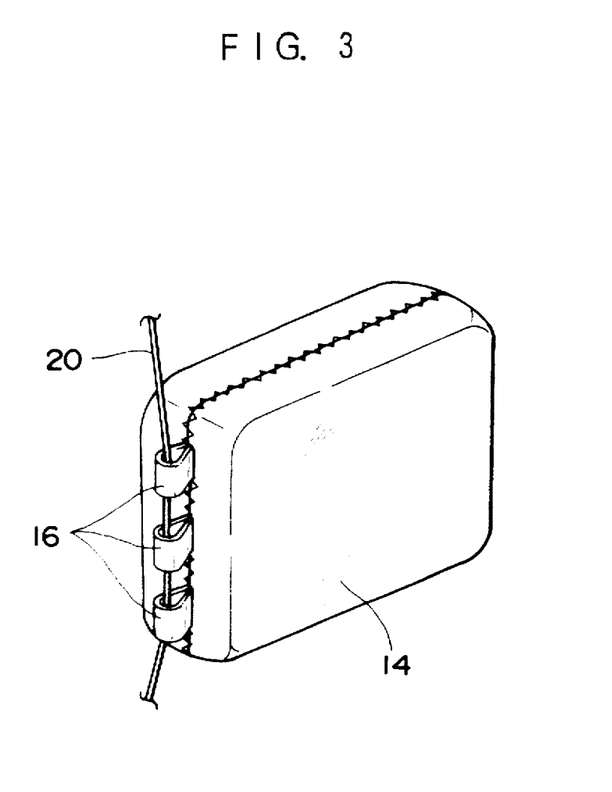
FIG. 3 is a perspective view depicting the state of expansion and inflation of the air bag shown in FIG. 1.

As shown in FIG. 3, the air bag 14 serves so as to inflate in the form of a rectangular parallelepiped. Further, annular through members 16 are vertically disposed at intervals at a transverse direction central portion of the side surface of the air bag 14, extending in the direction in which the air bag 14 expands and moves.

Figure 2:
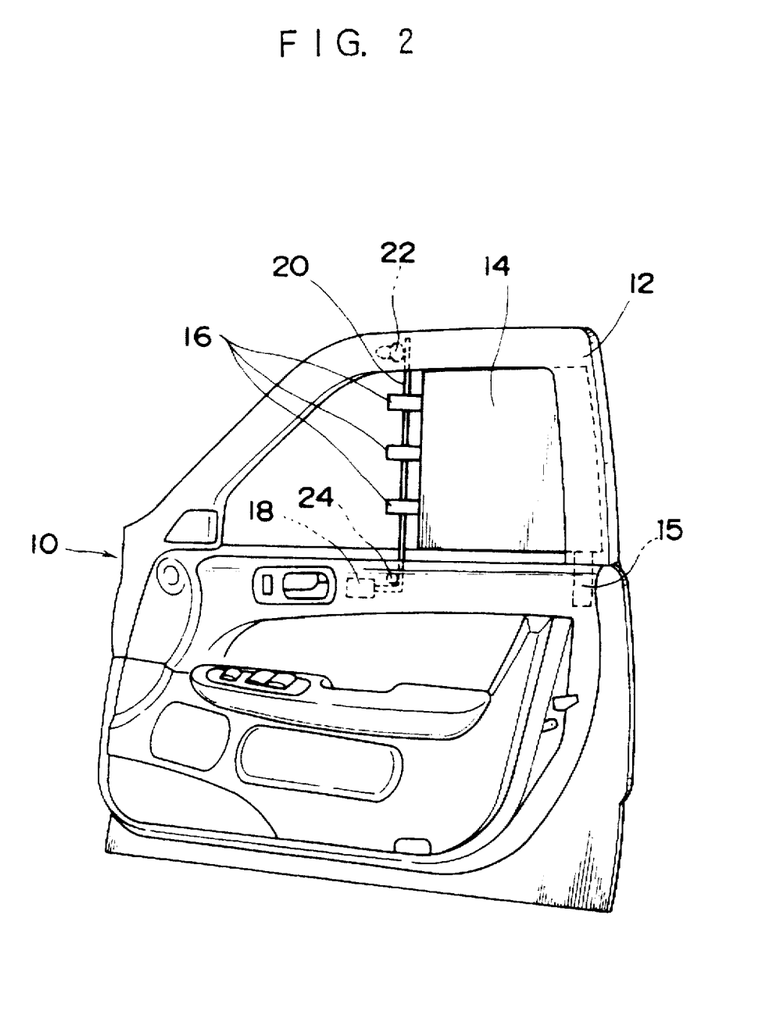
FIG. 2 is a front view illustrating in a state of expansion of an air bag the door portion shown in FIG. 1.

A tensile device 18 is accommodated at a transverse direction central position of a door trim portion to pull out the air bag 14 in an expanded form. Further, a wire 20 composed of a string member, which has been pulled out from the tensile device 18, penetrates annular loops of the through members 16 as shown in FIGS. 2 and 3 and is drawn around the window frame portion 12 from the door trim portion as shown in FIG. 1. Further, a free end of the wire 20 is fixed to a fixing member 22 disposed right above the tensile device 18.

Further, a guide member 24 composed of an erected axial pin or an axially-supported roller or the like is provided at a window side portion of the door trim portion, which is located in the vicinity of a wire withdrawal port of the tensile device 18.

Figure 4:
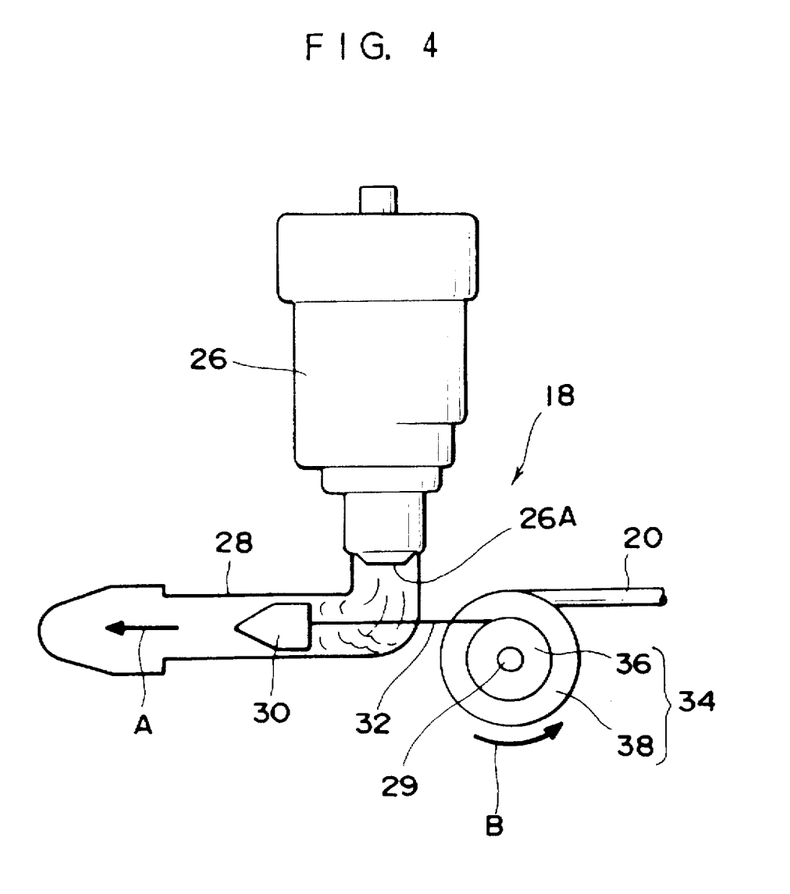
FIG. 4 is an explanatory view illustrating the structure of a tensile device employed in the vehicle occupant crash protector shown in FIG. 1.

As shown in FIG. 4 by way of example, the tensile device 18 is activated by an gas generating 26 with an acceleration sensor. Incidentally, the acceleration sensor described in the present specification is one which copes with a collision or impact which occurs at the side of the vehicle. For example, the acceleration sensor can be constructed of one which detects an acceleration developed in the direction transverse with respect to the direction of traveling of the vehicle or one which detects a load applied to the side of the vehicle. Alternatively, the acceleration sensor can be comprised of a sensor system or the like for predicting an impact of an object which approaches from the transverse direction of the vehicle. In the present specification, the term "coping with the impact occurring at the side" will be defined as the meaning that a vehicle occupant is protected against the collision of an object with the side of the vehicle or the possibility of the object colliding with the side thereof.

The gas generating portion 26 with the acceleration sensor has a gas injection hole 26A connected integrally with a cylindrical portion 28. A piston member 30 is provided in the vicinity of the gas injection hole 26A so as to be slidable within a cylinder of the cylindrical portion 28. One end of a traction or drawing wire 32 is fixed to the piston member 30. The other end of the drawing wire 32 is pulled out from the cylindrical portion 28 so as to be wound around a small-diameter wheel portion 36 of a pulley member 34 supported by an axial pin 29.

The small-diameter wheel portion 36 and a large-diameter wheel portion 38 concentric with the small-diameter wheel portion 36 are integrally provided as the pulley member 34. The pulley member 34 is provided with a backstop mechanism so as to rotate only in the direction indicated by arrow B in FIG. 4. A base end of the wire 20 is fixed to the large-diameter wheel portion 38.

The piston member 30 is displaced within the cylindrical portion 28 in the direction indicated by arrow A due to the flow of gas produced from the gas generating portion 26 so that the drawing wire 32 is also pulled in the direction indicated by arrow A. In doing so, the pulley member 34 is rotated by pulling out the drawing wire 32 from the small-diameter wheel portion 36 on which the drawing wire 32 has been wound, so that the base end of the wire 20 is wound around the large-diameter wheel portion 38. In the pulley member 34, the small-diameter wheel portion 36 is different in diameter from the large-diameter wheel portion 38. The length of the wire 20, which is wound around the large-diameter wheel portion 38, can be set longer than that of the drawing wire 32, which is pulled out from the small-diameter wheel portion 36. An alternate structure capable of instantaneously winding the wire 20 may be used as the tensile device 18 instead of the above-described structure. Further, the positions of the fixing member 22 and the tensile device 18 may be exchanged.

Effects and operations of the first embodiment constructed as described above will next be described In response to the impact which occurs at the side of the vehicle, the acceleration sensor of the as generating portion 26 ignites an a generator to generate gas, so that the tensile device 18 is activated so as to retract the wire 20 therein. In doing so, the wire 20, which has been placed in the state shown in FIG. 1, is withdrawn from the door window frame 12. As a result, the wire 20 is extending between the fixing member 22 and the guide member 24 so as to vertically extend along the center of the window of the door 10 as shown in FIG. 2. The through members 16 through which the wire 20 has been passed is pulled by the action of the wire 20 so that the air bag 14 is withdrawn from the window frame portion 12. As a result, the air bag 14 is expanded so as to cover a predetermined portion of a window opening or aperture.

Simultaneously with the operation of expansion of the air bag 14 owing to the pulling of the air bag 14 by the wire 20, the inflator 15 of the air bag 14 is activated to fill the air bag 14 with gas, thereby inflating the air bag 14 as shown in FIG. 3. The action of charging of the gas into the air bag 14 serves as an aid to the operation of expansion of the air bag 14 by the wire 20.

The air bag 14 is first filled with the gas in state in which the air bag 14 has been expanded under the action of the wire 20. It is thus possible to greatly reduce the time between the commencement of expansion and inflation of the air bag 14 and the completion thereof.

Further, a force developed when the head of an occupant is strongly pushed against the air bag 14 in the state in which the air bag 14 has been expanded and inflated as shown in FIG. 2, is supported by the window frame portion 12 fixing basal side portions of the air bag 14 and the wire 20 extending from the tensile device 18 to the fixing member 22 through the guide member 24. Further, since the structure of the present occupant crash protector is simple and the number of parts thereof is reduced, the present occupant crash protector can be manufactured at low cost.

Figure 5:
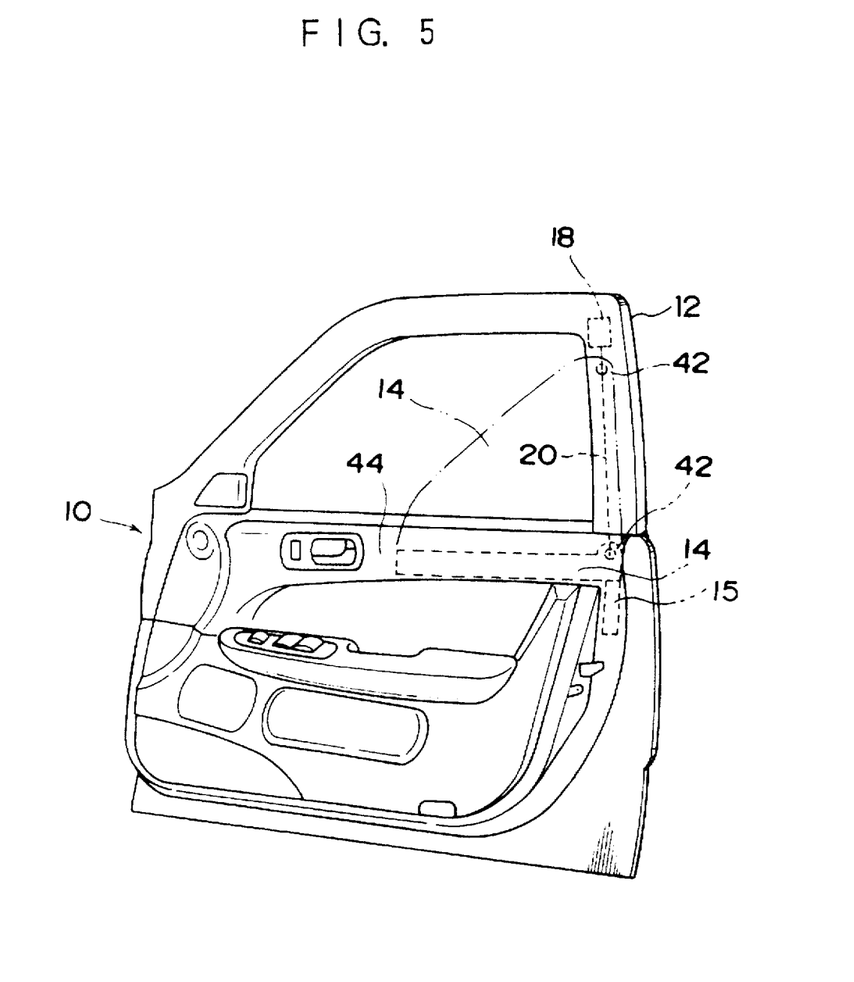
FIG. 5 is a front view showing in a normal state a door portion to which a vehicle occupant crash protector according to a second embodiment of the present invention is attached.
Figure 6:
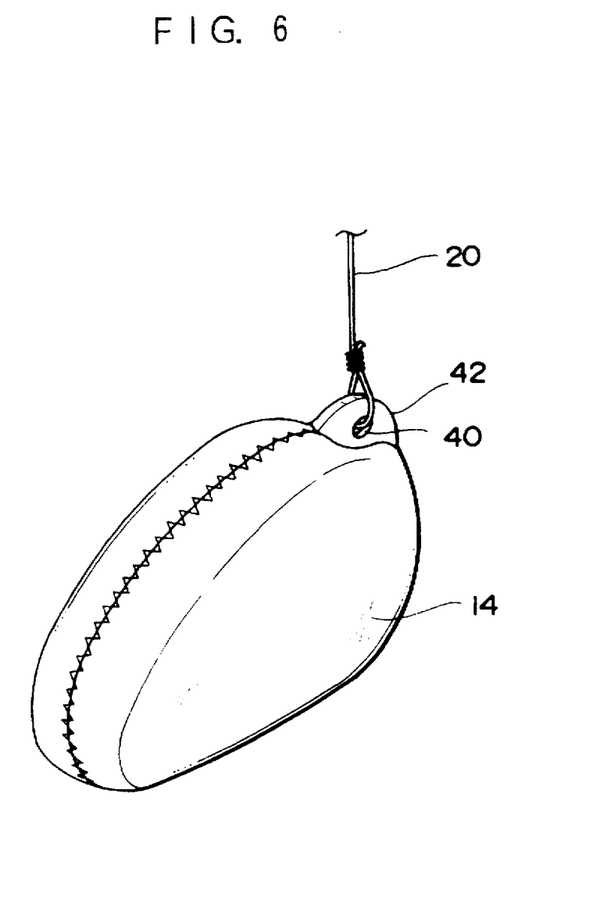
FIG. 6 is a perspective view showing a state of expansion and inflation of an air bag employed in the vehicle occupant crash protector shown in FIG. 5.

A second embodiment of the present invention will now be described with reference to FIGS. 5 and 6. The second embodiment is simplified in entire structure. Further, an air bag 14 employed in the second embodiment is shaped in the form of a triangle as seen from the front. An attachment portion 42 having a through hole defined therein is provided at an upper vertex portion of the air bag 14 as seen in the drawings.

The air bag 14 constructed in this way is slenderly folded and is accommodated within a door trim upper panel 44 of the door 10.

Further, a tensile device 18 is held within an upper portion of the window frame portion 12 on the center pillar side. The wire 20, which has been withdrawn from the tensile device 18, is caused to linearly extend into the window frame portion 12, and a free end of the wire 20 is tied to the through hole 40 of the attachment portion 42, whereby a vehicle occupant crash protector is constructed.

Effects and operations of the second embodiment constructed in the above-described manner will now be described. In order to cope with an impact which occurs at the side of a vehicle, the tensile device 18 is activated to rapidly pull the wire 20 therein, thereby pulling the attachment portion 42 so as to expand the air bag 14 into a state indicated by a two-dot chain line in FIG. 5.

Simultaneously with the above operation, an inflator 15 mounted on the acceleration sensor and connected to the air bag 14 is activated to generate gas. The generated gas is charged into the air bag 14 so that the air bag 14 is expanded and inflated. Since the air bag 14, which has been expanded and inflated in this way, is held by side portions fixed to the door trim upper panel 44, which correspond to the lower sides of the air bag 14 as seen in FIG. 5, and the tensile device 18 is suspended at three points, the air bag 14 can provide cushioning against the head of an occupant.

Since configurations, operations and effects other than those described in the second embodiment are identical to those in the first embodiment, the same elements of structure as those employed in the first embodiment are identified by the same reference numerals and their detailed description will be omitted.

Figure 7:
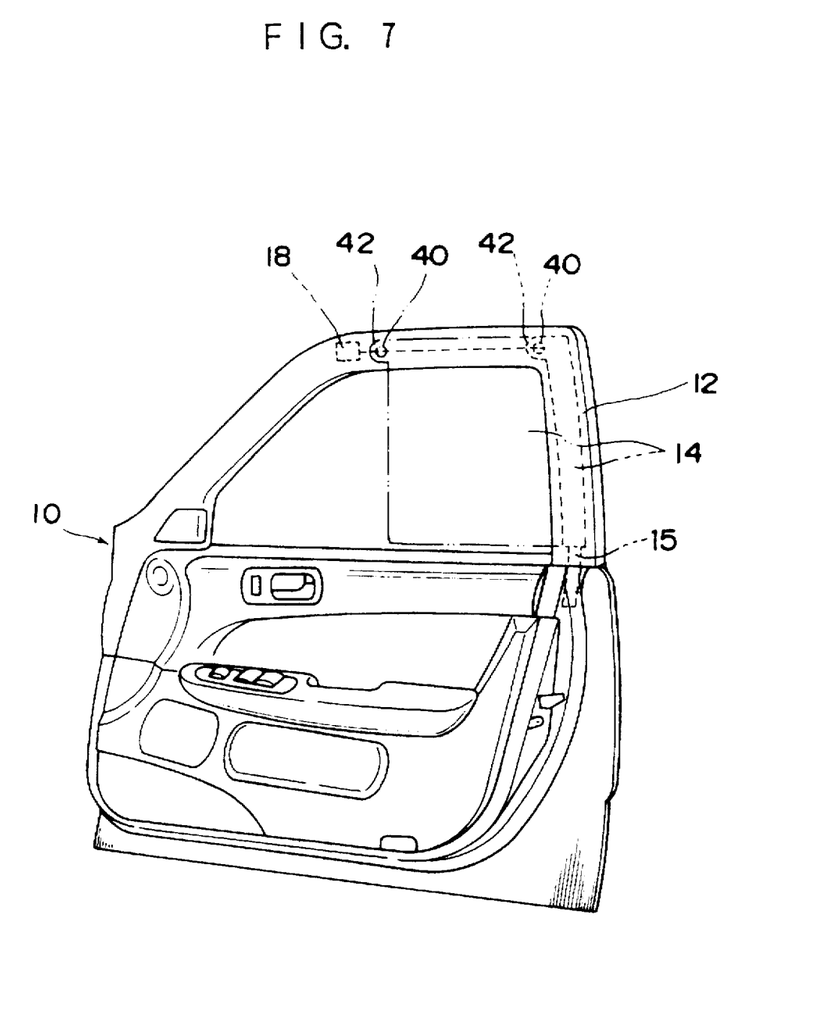
FIG. 7 is a front view illustrating a door portion to which a vehicle occupant crash protector according to a third embodiment of the present invention is attached.
Figure 8:
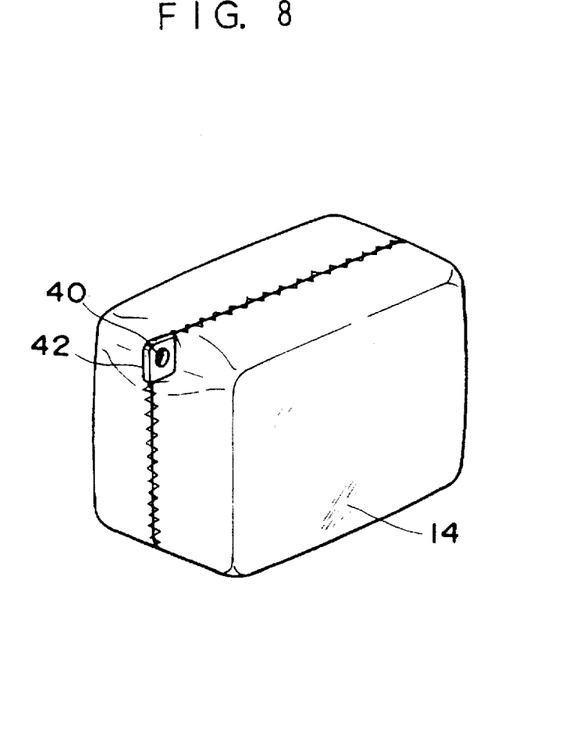
FIG. 8 is a perspective view depicting a state of expansion and inflation of an air bag employed in the vehicle occupant crash protector shown in FIG. 7.

A third embodiment of the present invention will now be described with reference to FIGS. 7 and 8. The third embodiment is simplified in entire structure and an air bag 14 employed in the third embodiment is shaped in the form of a quadrangle as seen from the front. Further, an attachment portion 42 having a through hole 40 defined therein is provided at the vertex of the upper corner on the left side of the air bag 14 as seen in the direction of the drawings.

The air bag 14 constructed in this way is slenderly folded and is accommodated within a window frame portion 12 on the center pillar side, of a door 10.

Further, a tensile device 18 is held within an upper portion of the window frame portion 12 on the front pillar side. A wire 20, which has been withdrawn from the tensile device 18, is horizontally pulled out so as to be held along the inside of the upper side of the window frame portion 12, and a free end of the wire 20 is tied to the through hole 40 of the attachment portion 42, whereby a vehicle occupant crash protector is constructed.

Effects and operations of the third embodiment constructed in the above-described manner will now be described. In order to cope with an impact which occurs at the side of the vehicle, the tensile device 18 is activated to rapidly retract the wire 20 therein, thereby pulling the attachment portion 42 so as to expand the air bag 14 into a state indicated by a two-dot chain line in FIG. 7.

Simultaneously with the above operation, an acceleration sensor-mounted inflator 15 of the air bag 14 is activated to generate gas. The generated gas is charged into the air bag 14 so that the air bag 14 is expanded and inflated. Since the air bag 14, which has been expanded and inflated in this way, is held by the side portion fixed to the window frame portion 12 on the center pillar side, and the tensile device 18 in three-point suspension form, the air bag 14 can exhibit cushioning against the head of an occupant.

Since configurations, operations and effects other than those described in the third embodiment are identical to those in the first embodiment, the same elements of structure as those employed in the first embodiment are identified by the same reference numerals and their detailed description will be omitted.

Incidentally, the first, second or third embodiment has described as an example the case where the vehicle occupant crash protector is mounted to the door 10 of the vehicle. It is however needless to say that other various forms such as mounting of the vehicle occupant crash protector to a roof portion or a portion of a vehicle side wall when there is a window at the side wall portion of the vehicle, can be adopted without departing from the gist of the present invention.

Since the present invention is constructed as described above, the present invention brings about an excellent effect in that the structure can be simplified, the number of parts can be reduced and the vehicle occupant crash protector capable of coping with the impact occurring at the side of the vehicle can be manufactured at low cost.

While the embodiments of the present invention, as herein disclosed, constitute a preferred form, it is to be understood that other forms might be adopted.

What is claimed is:

1. A vehicle occupant crash protector which copes with an impact which occurs at the side of a vehicle, comprising:

a bag provided so as to be folded in the vicinity of a window of the vehicle and expanded in a direction across said window by a flow of gas injected from an inflator;

at least one through member provided at an end of said bag in the direction in which said bag expands and moves;

a fixing member provided in the vicinity of the window; and a tensile device for retracting therein and supporting the other end of a string member having one end fixed to said fixing member and extending through said through member, thereby expanding said bag and holding a state of expansion of said bag.

2. A vehicle occupant crash protector according to claim 1, wherein said fixing member is placed near the window of the vehicle at a portion of a side of an end of the expanded bag in the direction in which said bag expands and moves, said tensile device is placed near the window of the vehicle at a portion across said window from said fixing member of the side of the end of the expanded bag in the direction in which said bag expands and moves, and said string member extending between said fixing member and said tensile device is capable of supporting the portion of said expanded bag through said through member.

3. A vehicle occupant crash protector according to claim 1, wherein said tensile device is activated by a gas generating portion with an acceleration sensor, which responds to the impact occurring at the side of the vehicle.

4. A vehicle occupant crash protector according to claim 3, wherein said gas generating portion includes a cylindrical portion integrally connected to a gas injection hole defined in said gas generating portion, a piston member disposed in the vicinity of the gas injection hole so as to be slidable within a cylinder of said cylindrical portion, a pulley member composed of a small-diameter wheel portion and a large-diameter wheel portion concentric with the small-diameter wheel portion, said small-diameter wheel portion and said large-diameter wheel portion being integrally formed, and a drawing wire having one end fixed to said piston member and the other end which is pulled out from said cylindrical portion so as to be wound around the small-diameter wheel portion of said pulley member, and said string member is fixed to the large-diameter wheel portion of said pulley member.

5. A vehicle occupant crash protector which copes with an impact occurring at the side of a vehicle, comprising:
a bag disposed so as to be folded in the vicinity of a window of the vehicle and expanded in a direction across said window by the flow of gas injected from an inflator;
an attachment member provided at an end of said bag in the direction in which said bag expands and moves; and
a tensile device for retracting therein and supporting a string member whose one end is fixed to said attachment member, thereby expanding said bag and holding a state of expansion of said bag.

6. A vehicle occupant crash protector according to claim 5, wherein said tensile device is activated by a gas generating portion with an acceleration sensor, which responds to the impact occurring at the side of the vehicle.

7. A vehicle occupant crash protector according to claim 6, wherein said gas generating portion includes a cylindrical portion integrally connected to a gas injection hole defined in said gas generating portion, a piston member disposed in the vicinity of the gas injection hole so as to be slidable within a cylinder of said cylindrical portion, a pulley member composed of a small-diameter wheel portion and a large-diameter wheel portion concentric with the small-diameter wheel portion, said small-diameter wheel portion and said large-diameter wheel portion being integrally formed, and a drawing wire having one end fixed to said piston member and the other end which is pulled out from said cylindrical portion so as to be wound around the small-diameter wheel portion of said pulley member, and said string member is fixed to the large-diameter wheel portion of said pulley member.

8. A vehicle occupant crash protector according to claim 5, wherein said bag is shaped in the form of a triangle as seen from a side.

9. A vehicle occupant crash protector according to claim 5, wherein said bag is shaped in the form of a quadrangle as seen from a side.

10. A vehicle occupant crash protector which copes with an impact occurring at the side of a vehicle, comprising:
a bag disposed so as to be folded in the vicinity of a window of the vehicle and expanded in a direction across said window by the flow of gas injected from an inflator;
a string member for pulling said bag; and
a tensile device for retracting therein and supporting said string member at the time of an impact which occurs at the side of the vehicle, thereby expanding said bag and holding a state of expansion of said bag.

11. A vehicle occupant crash protector according to claim 10, wherein said tensile device is activated by a gas generating portion with an acceleration sensor, which responds to the impact occurring at the side of the vehicle.

12. A vehicle occupant crash protector according to claim 11, wherein said gas generating portion includes a cylindrical portion integrally connected to a gas injection hole defined in said gas generating portion, a piston member disposed in the vicinity of the gas injection hole so as to be slidable within a cylinder of said cylindrical portion, a pulley member composed of a small-diameter wheel portion and a large-diameter wheel portion concentric with the small-diameter wheel portion, said small-diameter wheel portion and said large-diameter wheel portion being integrally formed, and a drawing wire having one end fixed to said piston member and the other end which is pulled out from said cylindrical portion so as to be wound around the small-diameter wheel portion of said pulley member, and said string member is fixed to the large-diameter wheel portion of said pulley member.

13. A vehicle occupant crash protector according to claim 10, wherein said bag includes a string engaging member which is provided at an end thereof in the direction in which said bag expands and moves, and engages with said string member.

14. A vehicle occupant crash protector according to claim 13, wherein said string engaging member is at least one through member provided at an end of said bag, a fixing member is provided in the vicinity of a window of the vehicle, and said string member has one end fixed to said fixing member and extending through said through member and the other end supported by said tensile device.

15. A vehicle occupant crash protector according to claim 14, wherein said fixing member is disposed in the vicinity of the window of the vehicle at a portion of a side of an end of the expanded bag in the direction in which said bag expands and moves,
said tensile device is disposed in the vicinity of the window of the vehicle at a portion across said window from said fixing member and across the direction in which said bag expands and moves, and
said string member extending between said fixing member and said tensile device is capable of supporting the portion of said expanded bag via said through member.

16. A vehicle occupant crash protector according to claim 13, wherein said string engaging member is an attachment member provided at the end of said bag and to which one end of said string member is attached.

17. A vehicle occupant crash protector according to claim 16, wherein said bag is shaped in the form of a triangle as seen from a side.

18. A vehicle occupant crash protector according to claim 16, wherein said bag is shaped in the form of a quadrangle as seen from a side.

* * * * *